United States Patent
Di Loreto et al.

(10) Patent No.: US 11,051,072 B2
(45) Date of Patent: Jun. 29, 2021

(54) MEDIA SPOILER EVALUATION AND MITIGATION

(71) Applicant: International Business Machines Corporation, Armonk, NY (US)

(72) Inventors: Anthony Di Loreto, Markham (CA); Ben Z. Akselrod, Givat Shmuel (IL); Kyle D. Robeson, North York (CA); Steve McDuff, Unionville (CA)

(73) Assignee: International Business Machines Corporation, Armonk, NY (US)

( * ) Notice: Subject to any disclaimer, the term of this patent is extended or adjusted under 35 U.S.C. 154(b) by 12 days.

(21) Appl. No.: 16/444,098

(22) Filed: Jun. 18, 2019

(65) Prior Publication Data

US 2020/0404372 A1    Dec. 24, 2020

(51) Int. Cl.
*H04N 21/454* (2011.01)
*H04N 21/6587* (2011.01)
*H04N 21/472* (2011.01)
*H04N 21/488* (2011.01)

(52) U.S. Cl.
CPC ..... *H04N 21/454* (2013.01); *H04N 21/47217* (2013.01); *H04N 21/4882* (2013.01); *H04N 21/6587* (2013.01)

(58) Field of Classification Search
CPC ......... H04N 21/44222; H04N 21/4532; H04N 21/454; H04N 21/4882
See application file for complete search history.

(56) References Cited

U.S. PATENT DOCUMENTS

| 8,332,894 | B2 | 12/2012 | Toebes |
| 9,002,942 | B2 | 4/2015 | Klein |
| 2012/0072941 | A1 | 3/2012 | Thornberry |
| 2013/0294755 | A1 | 11/2013 | Arme |
| 2015/0070516 | A1 | 3/2015 | Shoemake |
| 2018/0152759 | A1 | 5/2018 | Miller |
| 2018/0181566 | A1* | 6/2018 | Lee ................... H04W 4/023 |

(Continued)

FOREIGN PATENT DOCUMENTS

WO    2018098457 A1    5/2018

OTHER PUBLICATIONS

Boyd-Graber et al., "Spoiler Alert: Machine Learning Approaches to Detect Social Media Posts with Revelatory Information," Proceedings of the American Society for Information Science and Technology (ASIST) 2013, Nov. 1-6, 2013, 9 pages. <https://www.academia.edu/29570521/Spoiler_alert_Machine_learning_approaches_to_detect_social_media_posts_with_revelatory_information>.

(Continued)

*Primary Examiner* — Brian T Pendleton
*Assistant Examiner* — Kyle M Lotfi
(74) *Attorney, Agent, or Firm* — Brian D. Welle (57) ABSTRACT

A method, system, and computer program product evaluate and mitigate spoilers of entertainment media. A progress of a first user in consuming entertainment media may be tracked. A progress point at which the first user stops consuming the entertainment media may be identified. A second user consuming the entertainment media at a point that is beyond the progress point and within a vicinity of the first user may be detected. An upcoming spoiler for the first user of the entertainment media may be detected by evaluating data of the entertainment media. A mitigating action may be executed in response to detecting the upcoming spoiler.

18 Claims, 3 Drawing Sheets

(56) References Cited

U.S. PATENT DOCUMENTS

2018/0270002 A1\* 9/2018 Li .................... H04N 21/8549
2019/0208270 A1\* 7/2019 Bates ............... H04N 21/43615
2019/0253757 A1\* 8/2019 Leister ............. H04N 21/4886

OTHER PUBLICATIONS

Schiesser, "Google patents automated spoiler prevention system," TechSpot.com, Apr. 9, 2015, 5 pages. <https://www.techspot.com/news/60312-google-patents-automated-spoiler-prevention-system.html>.

\* cited by examiner

MEDIA SPOILER EVALUATION AND MITIGATION

BACKGROUND

As more and more users have subscribed to streaming services, more people are watching more forms of media on more devices than ever before. Some people may be watching three or four shows at a time, including watching episodes that were released months or even years ago. Further, it is becoming increasingly prevalent for entertainment media such as movies and television shows to intertwine characters and plots over years and decades with various characters having character arcs that span a decade in real time over the course of a few movies or television seasons. As such, there are arguably more concerns about a user having a critical moment in a television show or movie "spoiled" by accidentally learning about this moment before the user is able to view it as the user consumes the television show or movie at their own pace.

SUMMARY

Aspects of the present disclosure relate to a method, system, and computer program product relating to evaluating and mitigating media spoilers. For example, the method may include tracking a progress of a first user in consuming entertainment media. The method may further include identifying a progress point at which the first user stops consuming the entertainment media. The method may include detecting a second user consuming the entertainment media at a point that is beyond the progress point and within a vicinity of the first user. The method may further include detecting an upcoming spoiler for the first user of the entertainment media by evaluating data of the entertainment media. The method may also include executing a mitigating action in response to detecting the upcoming spoiler.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to evaluating and mitigating media spoilers, and more particular aspects relate to tracking a progress of a plurality of users through a plurality of media catalogues and taking a mitigating action in response to detecting an upcoming spoiler. While the present disclosure is not necessarily limited to such applications, various aspects of the disclosure may be appreciated through a discussion of various examples using this context.

In some examples, multiple people in a single household or among a group of friends may share some or all of the same interests in entertainment media such as television (TV) shows, movie franchises, podcasts, sports teams, or the like. Further, many of these people may be at different points in the entertainment media, such that some may not be caught up with the most recent show, movie, game, or the like. For example, a brother in a household may have watched through episode four of a television show, while the sister is only on episode two. In such a situation, if the sister walks into a room where the brother is watching episode five on a media device (e.g., a television or a laptop or the like), the sister may view or hear or otherwise consume some of the media content, therein realizing one or more plot points from episodes four or five that may diminish or eliminate or otherwise alter a literary or thematic element of the show. For example, the sister may see that a character has died by episode five that is alive in episode two. In this way, the sister may see a "spoiler" that has "spoiled" some elements of episodes two, three, or four.

In some examples, such concerns about avoiding spoilers may generally not relate to relatively expected literary or thematic elements of the show. As discussed herein, learning an unexpected literary or thematic element in such a way is referred to as a spoiler, as learning these unexpected elements before they are depicted in the regular course of viewing the media may "spoil" some enjoyment or literary value or the like of the media. For example, if episode one related to a character getting ready for college, after which a scene in episode five that depicts the character at college may not be a spoiler, as there is nothing surprising or unexpected that would impact a viewer's enjoyment when consuming the media.

Aspects of the disclosure relate to tracking a progress of one or more users, determining when one of them is about to consume a spoiler relative to their progress, therein generating a mitigating action to mitigate this spoiler. This mitigating action may include an alert, an action to blank out the media, modifying the media to avoid the spoiler, a provision of one or more media portions to set up (and therein explain and "unspoil") the potential spoiler, some combination of these, or the like. A computing system may utilize a controller (which may include a processor and/or a memory containing instructions that cause the processor to execute operations) to evaluate and/or manage spoilers in this way.

For example, the controller may track or otherwise identify a progress of one or more users in watching one or more sets of entertainment media. As used herein, entertainment media may include entertainment media that is consumable (e.g., viewable or hearable) by multiple users at once, such as television shows, movies, podcasts, live sports, or the like. Further, entertainment media may include media that tells a story, such as an episodic story over the course of many episodes or movies or the like. Alternatively, entertainment media may include live events such as televised sporting events.

Figure 1:
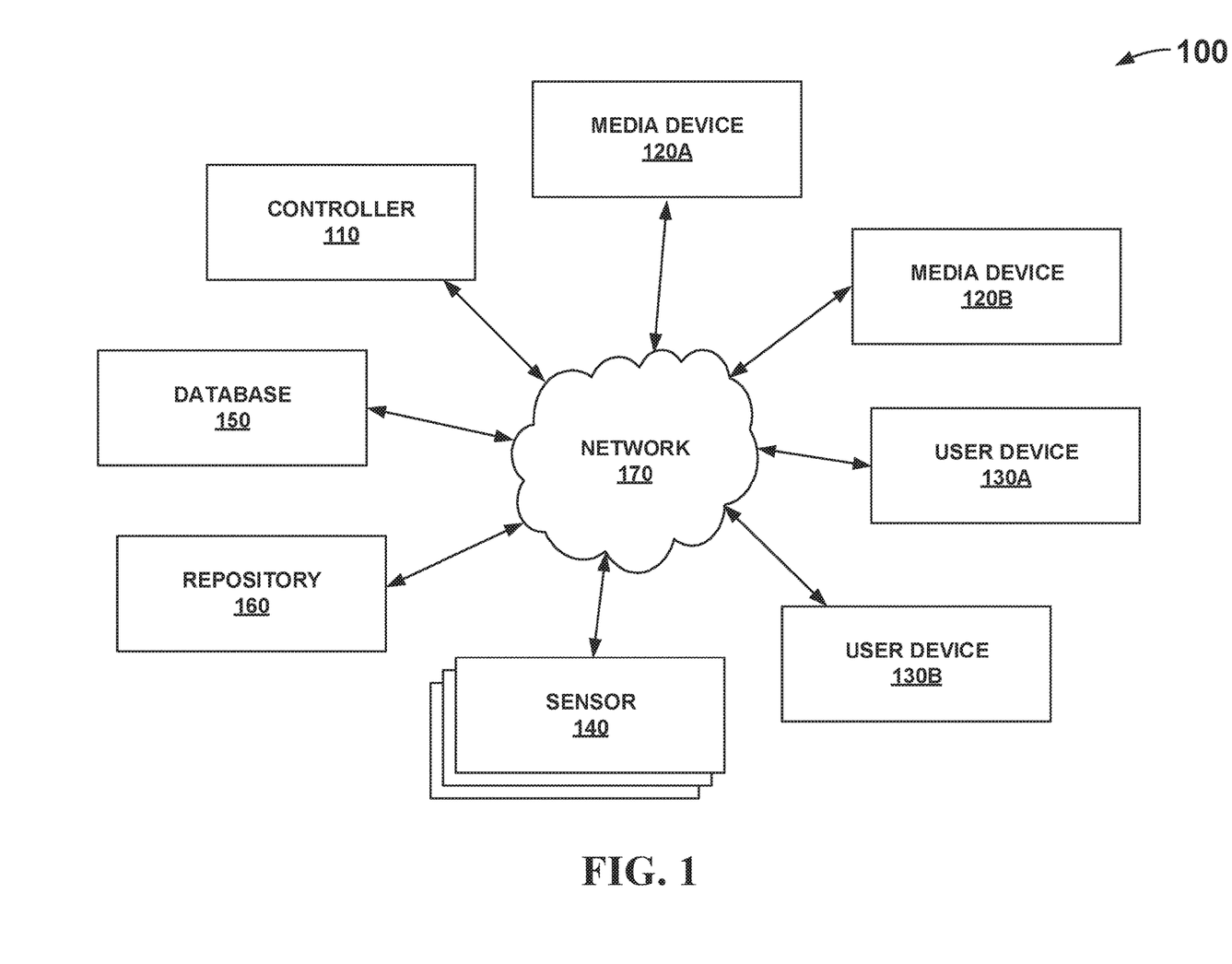
FIG. 1 depicts a conceptual diagram of an example system in which a controller evaluates and mitigates spoilers of media as viewed across a plurality of media devices.
Figure 2:
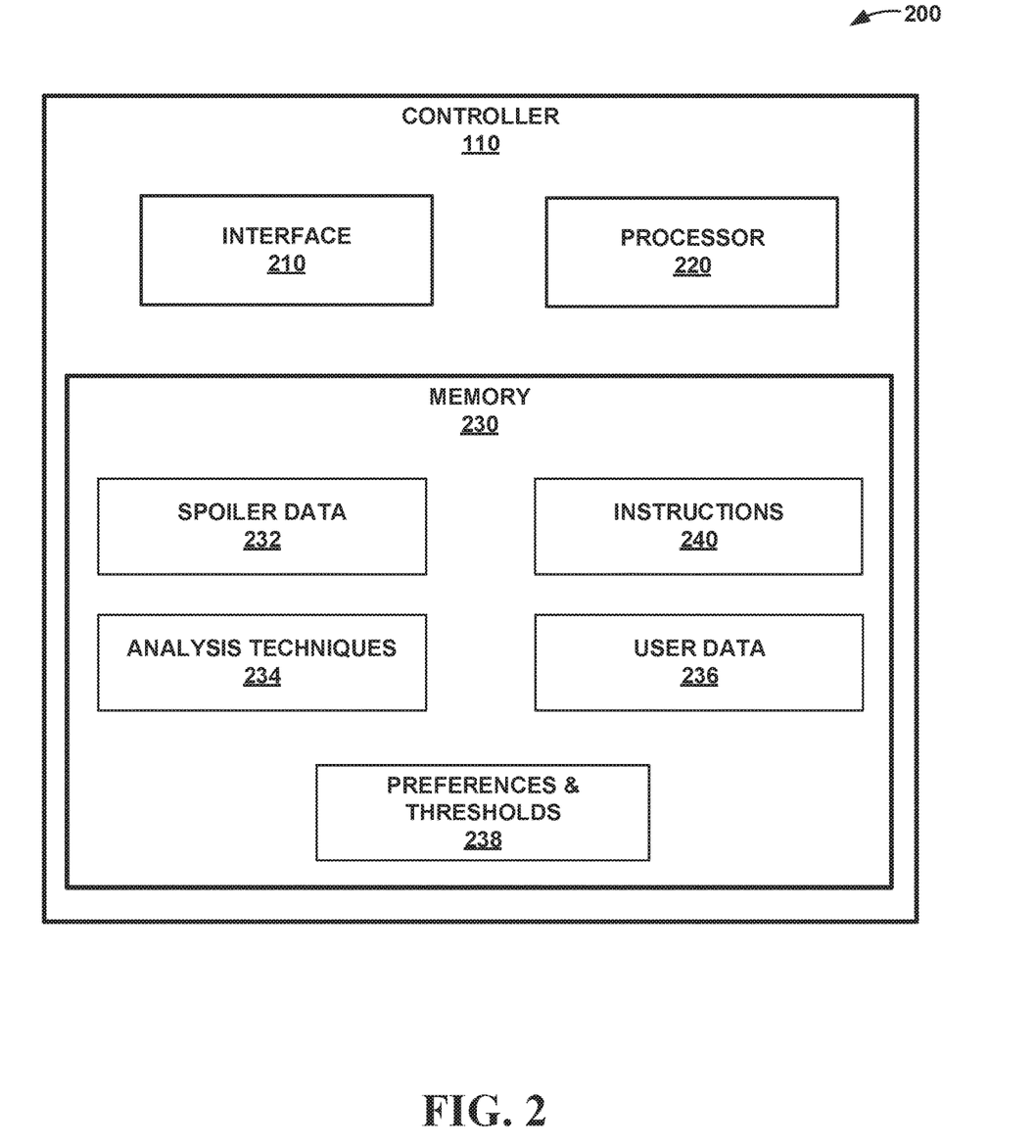
FIG. 2 depicts a conceptual box diagram of a computing system that may be configured to evaluate and mitigate media spoilers.

For example, FIG. 1 depicts system 100 that includes controller 110 that is configured to evaluate and manage spoilers in entertainment media. Controller 110 may include a computing device, such as computing device 200 of FIG.

2 that includes a processor communicatively coupled to a memory that includes instructions that, when executed by the processor, cause controller 110 to execute the operations described below. Controller 110 may monitor entertainment media as viewed using one or more media devices 120A, 120B (collectively referred to as "media devices 120"). Media devices 120 may include computing devices (similar to computing device 200 of FIG. 3 as described below) such as televisions, laptops, desktop computers, tablets, streaming sticks, or the like. Media devices 120 may be configured to provide entertainment media to a plurality of users at once. Media devices 120 may provide the entertainment media as sent to media devices 120 or as stored on a source available to media devices 120 or the like.

Controller 110 may monitor entertainment media that is consumed by users as provided by media devices 120. For example, controller 110 may monitor entertainment media being streamed to media devices 120, such as where media devices 120 include a laptop that is streaming media from an online source (e.g., such as a streaming service). For another example, controller 110 may monitor entertainment media being broadcast to media devices 120, such as where media devices 120 include a television that is being used to view a live sports broadcast. For another example, controller 110 may monitor entertainment media being viewed from a local source such as from a DVD player or the like.

Controller 110 may monitor entertainment media that is being consumed by users utilizing media devices 120 over network 170. Network 170 may include a computing network over which computing messages may be sent and/or received. For example, network 170 may include the Internet, a local area network (LAN), a wide area network (WAN), a wireless network such as a wireless LAN (WLAN), or the like. Network 170 may comprise copper transmission cables, optical transmission fibers, wireless transmission, routers, firewalls, switches, gateway computers and/or edge servers. A network adapter card or network interface in each computing/processing device (e.g., controller 110, media devices 120, and/or database 150) may receive messages and/or instructions from and/or through network 170 and forward the messages and/or instructions for storage or execution or the like to a respective memory or processor of the respective computing/processing device.

Though network 170 is depicted as a single entity in FIG. 1 for purposes of illustration, in other examples network 170 may include a plurality of private or public networks. For example, media devices 120 may communicate together over a private WLAN of network 170, such as a home WLAN network. Further, controller 110 may communicate with database 150 over a private LAN of network 170. Additionally, controller 110 may communicate with media devices 120 over a public portion of network 170 using the Internet.

Controller 110 may identify one or more users that are consuming the entertainment media. As used herein, a user may be identified as consuming the entertainment media if a likelihood that the user is in a vicinity of respective media devices 120 that are providing the entertainment media surpasses a threshold. For example, controller 110 may identifying that media device 120A is streaming entertainment media that is associated with a profile "Ashley Jones" from a streaming service. In response to identifying this, controller 110 may determine that a user "Ashley" is relatively likely to be consuming the entertainment media that is being streamed (e.g., as user "Ashley" owns and predominantly uses the profile "Ashley Jones"). For another example, controller 110 may identify that media device 120A is associated with a user, such as being owned or primarily used by a user (e.g., where media device 120A is a cell phone or laptop or the like that is associated with the user "Ashley"), such that entertainment media being provided by media device 120A is likely to be consumed by this user.

In some examples, controller 110 may detect that a user is in a vicinity of media device 120A that is providing entertainment media. As used herein, a user may be within a vicinity of media devices 120 providing entertainment media if the users are close enough that the user has a reasonable expectation of seeing or hearing or otherwise consuming some of the entertainment media as provided by media devices 120. For example, a user may be within a vicinity of media devices 120 that are providing entertainment media if the users are within the same room as media devices 120, or within the same building of media devices 120 (e.g., when the user walks into a home that with a TV media device 120 that is playing a movie), or within a threshold distance (e.g., 20 feet) of media device 120, or the like.

In some examples, controller 110 may detect that a user is within a vicinity of one or more media devices 120 that are providing entertainment media by detecting that one or more user devices 130A, 130B (collectively referred to as "user devices 130") are within a vicinity of the one or more media devices 120. User devices 130 may include computing devices (e.g., similar to computing device 200 of FIG. 2) that are associated with (e.g., owned or otherwise predominantly operated by) a user such as a mobile phone, smart watch, laptop, or the like. For example, controller 110 may receive location data from one or more user devices 130 (e.g., such as global position system (GPS) data or global navigation satellite system (GNSS) data) that controller 110 uses to locate the one or more user devices 130. Where media devices 120 are in a static location (e.g., a television that is within a living room), controller 110 may detect when user devices 130 are within a threshold distance of this static location, indicating that users of these user devices 130 are within a vicinity of respective media devices 120. Alternatively, or additionally, where media devices 120 are relatively mobile (e.g., where the media devices 120 include a laptop or speakers or the like), controller 110 may gather location data of both media devices 120 and user devices 130 and determine when the two are within a threshold distance of each other.

In some examples, controller 110 may identify that one or more user devices 130 are in a vicinity of media devices 120 as a result of the respective user devices 130 and media devices 120 sharing a private portion of network 170. For example, controller 110 may detect user device 130A connecting to a private WLAN portion of network 170 that is associated with media device 120A. Controller 110 may utilize data from a router or the like to determine that user device 130A is connecting to a private portion of network 170 that is associated with media device 120A. For another example, controller 110 may use near field communication (NFC) or the like to detect user device 130A being near media device 120A. For example, controller 110 may have previously identified that user device 130B as being in a vicinity of media device 120A, and may further detect, using NFC techniques, that user device 130A is within a vicinity of user device 130B (and therein within a vicinity of media device 120A).

In certain examples, controller 110 may utilize one or more sensors 140 to detect a presence of a user. Sensors 140 may include computing devices (e.g., similar to computing device 200 of FIG. 2) that are configured to gather or otherwise receive data. Sensors 140 may include computing devices of the Internet of Things (IoT) and/or computing devices of a building automation system or building security system or the like. For example, sensors 140 may include a camera that gathers an image of a user to identify that the user is in the area. For another example, sensors 140 may include a device with a microphone that gathers audio data of the user to identify that the user is in the area (e.g., as a result of this user speaking an auditory command to sensor 140). For another example, sensors 140 may include one or more smart appliances that have settings that are specified for the user (e.g., a coffee machine that makes a coffee in a particular way for the user, or speakers that play particular music for the user, or lights that set up a particular lighting for the user, or a garage door opener that detects an incoming car of the user to open a garage door for the user, and controller 110 may determine that the user is in the vicinity of sensors 140 as a result of sensors 140 automating the smart appliances in a manner that is consistent with the user. In this way, using facial recognition or voice recognition or IoT data or the like, controller 110 may use sensors 140 to determine some or all users that are in the vicinity.

As mentioned above, controller 110 may monitor and track a progress of users in consuming entertainment media. For example, controller 110 may keep a record of some, most, or substantially all entertainment media that has been consumed by a user (e.g., played by one or more media devices 120 when the user was in the vicinity of the media devices 120 as detected above). Controller 110 may store this progress data in database 150, which may be a computing device as described herein. For example, database 150 may include a server or a rack of servers or a laptop or a desktop or the like. Controller 110 may access database 150 over network. Though database 150 is depicted as a separate device from controller 110 for the sake of illustration, in other examples database 150 may be functionally integrated into controller (e.g., as depicted in FIG. 2).

Controller 110 may receive an opt-in from one or all of users and/or user devices 130 prior to gathering and/or receiving entertainment media consumption data. For example, one or many or each of user devices 130 may affirmatively go to a software application associated with controller 110 in order to authorize controller 110 to gather and/or receive some or all of the data described herein. In some examples, a single user device 130A that has administrative privileges over many or substantially all user devices 130 (e.g., a device that is associated with a legal guardian over the users of the other devices) may authorize controller 110 to gather and/or receive data from many or all other user devices 130.

In some examples, controller 110 may provide computing agents that are housed on media devices 120, user devices 130, and/or sensors 140 to forward data as described herein (e.g., entertainment media consumption data, location data, facial recognition data, voice recognition data, IoT data, or the like) to controller 110. These computing agents may be configured to substantially only forward along such data that meet the criteria of data in database 150, which is to say data that relates to evaluating and managing potential entertainment media spoilers. Alternatively, or additionally, controller 110 may itself gather or collect data that is sent to and/or between media devices 120, user devices 130, and/or sensors 140 as this data is transmitted over network 170 (e.g., by evaluating messages that traverse a firewall of network 170).

Controller 110 may identify spoilers of the entertainment media being consumed by the users. In some examples, the entertainment media as presented by media devices 120 may include metadata on one or more spoilers, such that controller 110 may detect and read this metadata to identify the spoilers. This metadata may indicate one or more portions of the entertainment media, such as an originating portion that may be "spoiled" by a spoiler (e.g., where the originating portion is the scene or clip during which a twist or plot point is initially revealed by the entertainment media). In some examples, the originating portion may include one or more "setup" portions of the entertainment media that may establish one or more elements of the plot points (e.g., via foreshadowing or the like). Metadata may also indicate some or all spoiler portions that occur after the originating portion that may spoil the originating portion. In some examples, this metadata may further indicate a general severity of the spoilers, where a more severe spoiler reveals a relatively more important or surprising plot point.

In other examples, controller 110 may crawl through online repositories 160 (e.g., online forums or reviews or film databases r the like) on network 170 to identify spoilers and originating portions and the like. For example, controller 110 may identify online repositories 160 that include forums that relate to a specific body of entertainment media (e.g., a specific television show, film franchise, or the like), and identify that a specific portion of the forum is flagged or tagged as including spoilers. Controller 110 may execute natural language processing (NLP) techniques as discussed herein to identify the content of the spoiler, including foreshadowing portions, the actual origination portion where the plot points are revealed, and/or further portions of the show that spoil these plot points.

In some examples, controller 110 may use techniques such as these to identify spoilers that are not within the entertainment media itself. For example, controller 110 may identify spoilers within interviews, trailers and/or teasers, news articles, or the like. Controller 110 may be sent this spoiler data by one or more agents, by crawling through one or more repositories 160, or by other techniques consistent with this disclosure.

Further, controller 110 may be configured to identify spoiler data from the entertainment media itself. For example, controller 110 may be configured to utilize NLP techniques as described herein to identify originating portions, setup portions, and/or spoilers that following the originating portions. Controller 110 may identify these elements of the entertainment media by crawling through the actual audio and/or video data of the entertainment media. For example, controller 110 may identify a line of "Darth Vader is Luke's father" that is tagged as a spoiler for all social media related to the body of entertainment media "Star Wars." Controller 110 may further use image recognition techniques, speech-to-text techniques, NLP techniques or the like to therein crawl through the media to identify portions of entertainment media that relate to this spoiler. For example, controller 110 may use facial recognition techniques and speech-to-text techniques to identify a portion of the media in which a character "Darth Vader" saying "I am your father" at an end of a movie "The Empire Strikes Back as an originating portion of this spoiler (such that this is the scene at which the plot point is revealed, and no spoilers of this scene will exist before this portion of the media). Controller 110 may determine that, once a user has seen this portion, the user may be past this "spoiler" such that there is minimal or no concern over the spoiler. Controller 110 may also identify setup portions for this originating portions, such as scenes from this movie and/or a preceding movie in which the character Luke discusses his father. Controller 110 may similarly identify spoiler portions of the media past this originating portion of the entertainment media that spoil this originating portion, such as a scene at the beginning of a subsequent film "Return of the Jedi" in which a character identified as Luke (e.g., by facial recognition techniques from gathering face images of Luke from the Internet) says "is Darth Vader my father?"

Controller 110 may execute a mitigating action in response to detecting an upcoming spoiler. As described herein, the mitigating action may include sending a notification to user device 130 associated with a user, such as by sending a text message to a cell phone user device 130 associated with the user. Alternatively, or additionally, controller 110 may pause the entertainment media as being presented on media devices 120. Alternatively, or additionally, controller 110 may modify the entertainment media. For example, controller 110 may skip the spoiler portion of the entertainment media, instead showing text that conveys necessary information of the scene while skipping the spoiler. Controller 110 may use NLP techniques or the like to determine other elements of the scene to present to maintain continuity within the entertainment media.

For example, continuing the Star Wars example from above, controller 110 may black out the scene and mute the dialogue when Luke says "is Darth Vader my father," instead generating text that says "Luke asks if Darth Vader was telling the truth regarding Luke's father," to avoid the spoiler. In some examples, modification media (e.g., replacement data that is generated by media devices 120 rather than spoiling portions in response to controller 110 modifying the entertainment media) may be stored within entertainment media as metadata of the entertainment media. In other examples, controller 110 may dynamically generate this modification media by analyzing the entertainment media and/or by analyzing data from one or more repositories 160 or the like.

In some examples, in response to identifying an upcoming spoiler, controller 110 may generate information on setup portions and/or the originating portion of the entertainment media that a spoiler portion spoils. In this way, a user may go back and watch just these portions of the entertainment media before watching the upcoming spoiler. In some examples, controller 110 may provide the user (e.g., by sending a notification to one or more relevant user devices 130) with specific details of where the setup and/or originating portions are (e.g., by providing specific times and movies and/or episodes at which the setup and/or originating portions may be found), and/or controller 110 may generate a link that a user may press to cause media device 120 to provide these setup and/or originating portions.

Controller 110 may use user preferences to manage spoilers. For example, user preferences may dictate a spoiler severity threshold that a user may have, such that controller 110 does not generate a mitigating action for spoilers below that threshold. Controller 110 may determine a severity of spoilers by identifying the severity from metadata of the entertainment media (e.g., where the media includes this information), by gauging an amount or nature of feedback from such spoilers online, by identifying an amount that the entertainment media references this spoiler after the origination portion, or other such techniques.

In some examples, in response to determining to execute a mitigating action (e.g., in response to determining that the upcoming spoiler was of a severity that exceeded a user-specified threshold), controller 110 may execute one or more predetermined mitigating actions based on one or more user preferences. For example, controller 110 may have tracked the relative progress of two users to determine that a first user has a current progress point four episodes into a TV show while a second user has a progress point thirty episodes into the TV show. Further, controller 110 may identify that the second user is rewatching the entertainment media, such that the second user has seen the entire set of this entertainment media. Controller 110 may identify that the second user is currently playing episode thirty when the first user walks into the room, and that an upcoming spoiler of an originating portion from episode twenty is approaching (e.g., it will be shown within a threshold amount of time of as five minutes). Controller 110 may consult user preferences of the second user to determine that, for a first watch-through, the second user does not like to have entertainment media interrupted, but for subsequent walk-throughs that the user does not mind having entertainment media interrupted or modified for the sake of mitigating spoilers. In response to this determination, controller 110 may pause the entertainment media and provide an option (e.g., to one or both of user devices 130) to either modify the entertainment media or to cause the media device 120 to provide the setup and/or originating portions from the previous episodes before showing the upcoming spoiler. Controller 110 may receive a request from one or both user devices 130 to modify the entertainment media, in response to which the entertainment media is modified and the spoiler is avoided being presented to the first user.

As described above, controller 110 may include computing device 200 with a processor configured to execute instructions stored on a memory to execute the techniques described herein. For example, FIG. 2 is a conceptual box diagram of such computing device 200 of controller 110. While controller 110 is depicted as a single entity (e.g., within a single housing) for the purposes of illustration, in other example controller 110 may include two or more discrete physical systems (e.g., within two or more discrete housings). Controller 110 may include interfaces 210, processor 220, and memory 230. Controller 110 may include any number or amount of interface(s) 210, processor(s) 220, and/or memory(s) 230.

Controller 110 may include components that enable controller 110 to communicate with (e.g., send data to and receive and utilize data transmitted by) devices that are external to controller 110. For example, controller 110 may include interface 210 that is configured to enable controller 110 and components within controller 110 (e.g., such as processor 220) and/or to communicate with entities external to controller 110. Specifically, interface 210 may be configured to enable components of controller 110 to communicate with media devices 120, user devices 130, sensor(s) 140, database 150, or the like. Interface 210 may include one or more network interface cards, such as Ethernet cards, and/or any other types of interface devices that can send and receive information. Any suitable number of interfaces may be used to perform the described functions according to particular needs.

As discussed herein, controller 110 may be configured to evaluate and mitigate spoilers of entertainment media. Controller 110 may utilize processor 220 to evaluate and mitigate spoilers of entertainment media. Processor 220 may include, for example, microprocessors, digital signal processors (DSPs), application specific integrated circuits (ASICs), field-programmable gate arrays (FPGAs), and/or equivalent discrete or integrated logic circuit. Two or more of processor 220 may be configured to work together to evaluate and mitigate spoilers of entertainment media.

Processor 220 may evaluate and mitigate spoilers of entertainment media according to instructions 240 stored on memory 230 of controller 110. Memory 230 may include a computer-readable storage medium or computer-readable storage device. In some examples, memory 230 may include one or more of a short-term memory or a long-term memory. Memory 230 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like. In some examples, processor 220 may evaluate and mitigate spoilers of entertainment media according to instructions 240 of one or more applications (e.g., software applications) stored in memory 230 of controller 110.

In addition to instructions 240, in some examples gathered or predetermined data or techniques or the like as used by processor 220 to evaluate and mitigate spoilers of entertainment media may be stored within memory 230. For example, memory 230 may include information described above that may be stored in database 150, and/or may include substantially all of database 150. As depicted in FIG. 2, memory 230 may include spoiler data 232.

Spoiler data 232 may include data on originating portions and/or setup portions (that set up the originating portions) of entertainment media that may be spoiled by a premature consumption of spoilers of the same entertainment media. For example, spoiler data 232 may include setup portions that set up or otherwise explain or foreshadow upcoming narrative twists or surprises or otherwise impactful moments in the entertainment media. Spoiler data 232 may also indicate the originating portion of the entertainment media at which the narrative twist or surprise or development is initially revealed. Spoiler data 232 may further include all spoilers of the entertainment media that come after the originating portions. In some examples, controller 110 may store and/or access spoiler data 232 such that setup portions, originating portions, and/or spoiling portions may be paired together. By pairing together setup portions, originating portions, and spoiling portions of entertainment media, controller 110 may be configured to navigate between spoilers and the portions of the media that can negate those spoilers.

In some examples spoiler data 232 may include a relative severity of spoilers. For example, spoiler data 232 may include a ranked (e.g., between 1-10) severity of all originating portions of the entertainment media. Using such a ranking or listed severity, controller 110 may identify which originating portions are relatively more dramatic or meaningful or otherwise have more relative impact on the entertainment media. Further, for each originating portion, spoiler data 232 may include a ranking of how much subsequent spoilers may "spoil" these originating portions. For example, a first spoiler portion may tangentially hint at a twist of an originating portion while a second spoiler directly spells out the details of a twist of an originating portion, such that the second spoiler is identified as relatively more severe. In this way, spoiler data 232 may include a relative severity of spoilers in a variety of manners.

In some examples, spoiler data 232 may include media that is not included in the original entertainment media. For example, spoiler data may include trailers or teasers of the entertainment media and/or trailers or teasers that are related to (e.g., such as spoofs of) the entertainment media. Further, spoiler data 232 may include interviews or news stories or the like that include spoilers of the media data as described herein. Controller 110 may identify these trailers or interviews or other similar portions of media data as including spoilers using the techniques described herein, such as using metadata that identifies these as including spoilers, and/or through crawling through commentary of these trailers or interviews online (e.g., as found in repositories 160), or the like.

Memory 230 may include analysis techniques 234 that controller 110 may use to recognize and analyze spoiler data and/or user data as gathered from media devices 120, user devices 130, sensors 140, and/or repositories 160 over network 170. For example, analysis techniques 234 may include such data analyzing techniques as NLP techniques, image recognition techniques, speech-to-text techniques, or the like. NLP techniques can include, but are not limited to, semantic similarity, syntactic analysis, and ontological matching. For example, in some embodiments, processor 220 may be configured to parse comments from online forums in repositories 160 related to entertainment media played on media devices 120 to determine semantic features (e.g., word meanings, repeated words, keywords, etc.) and/or syntactic features (e.g., word structure, location of semantic features in headings, title, etc.) of the online forums. Ontological matching could be used to map semantic and/or syntactic features to a particular concept. The concept can then be used to determine the subject matter. In this way, using NLP techniques, controller 110 may, e.g., identify an online forum as discussing spoilers, and therein gather spoiler data 232 from these forums.

Similarly, analysis techniques 234 may include image recognition techniques such as optical character recognition (OCR) for identifying text, or general shape identification and/or recognition techniques, or object tracking techniques where images are received as a stream of images (e.g., as part of a video feed) to identify if a user is in a vicinity as described herein. Controller 110 may use these analysis techniques 234 to analyze image data of entertainment media to identify spoiler data 232, to identify that a user is in a vicinity using data from sensors 140, or the like. For example, controller 110 may identify a humanoid shape from entertainment media as matching an online profile of a character to identify spoilers related to that character. Further, analysis techniques 234 may include speech-to-text techniques that may be used by controller 110 to identify the text of speech of the entertainment media to further identify spoiler data related to the characters of the entertainment media that controller 110 identifies.

Further, memory 230 can include user data 236, which may include a list of many or all users for which controller 110 may evaluate and mitigate spoilers. User data 236 may include a general profile of each user, such as profiles that provide sufficient information to identify each user through data gathered over network 170. For example, user data 236 may include a voice profile and facial recognition pattern and the like for one or more users, such that controller 110 may use user data 236 to identify these users when they communicate over network 170 (e.g., using a web conference). User data 236 may also include a set of media devices 120 that are associated with each user (e.g., such as a television or speaker), a set of user devices 130 that are associated with each user (e.g., such as a laptop and a cell phone of the user) and/or a set of usernames or online identifiers for each user (e.g., an email or specific subscription identifier for a streaming service) to use to track a progress of user as the user consume entertainment media.

User data 236 may also include media tracking data. Media tracking data may include progress points within media of one or more users. In some examples, user data 236 may include media tracking data for each user for each set of entertainment media that the respective users are consuming. Media tracking data may include progress points of each user in consuming, e.g., a few television shows, a few podcasts, a sports game that is currently paused, and in some movie trilogies. In some examples, user data 236 may include whether a user is watching through entertainment media a first time, a second time, or the like. In such examples, the most recent portion of the entertainment media that has been consumed by the user may be identified as the progress point of the user.

In some examples, a first user may jump through entertainment media in watching the entertainment media. For example, the first user may watch the entertainment media with a second user, where the second user regularly watches even when the first does not, and the first watches along as possible, such that the first user has seen the episodes 1-4, 6, 9-10, and 12 of a show. In such examples, user data 236 may include such information, such that the user may include many progress points associated with the user. In such an example, where controller 110 detects an upcoming spoiler in episode 13 relating to an originating portion from episode 11, controller 110 may identify this as a spoiler even though the user has a progress point past episode 11 (e.g., in episode 12). In response to detecting this upcoming spoiler, controller 110 may, e.g., send a notification as discussed herein to user devices 130 of both users detailing the specific time of the originating portion in episode 11, enabling the users to quickly get the first user up to speed so that both users can enjoy episode 13 together.

Memory 230 may also include preferences and thresholds 238. Preferences and thresholds 238 may include data on when and how users of user data 236 would like controller 110 to execute a mitigating action in response to detecting upcoming spoilers of spoiler data 232. For example, preferences and thresholds 238 may include data on what mitigating actions controller 110 is to execute in response to detecting an incoming spoiler. For example, preferences and thresholds 238 may indicate how severe a spoiler has to be prior to controller 110 executing a mitigating action for a user to mitigate the spoiler. Preferences and thresholds 238 may indicate that the users would prefer controller 110 to execute mitigating actions for substantially all spoilers, or execute mitigating actions for climactic seasons and/or movie ending spoilers, or the like. Alternatively, or additionally, preferences and thresholds 238 may indicate that users would like controller 110 to execute different mitigating actions in response to detecting different spoilers. For example, preferences and thresholds 238 may indicate that a user would like controller 110 to send a text message indicating an upcoming spoiler for a relatively small spoiler and to both pause entertainment media and send a text message for a relatively more severe spoiler.

Preferences and thresholds 238 may further indicate how the "primary" user that is currently watching the entertainment media prefers that controller 110 execute mitigating actions when the entertainment media is about to spoil a thematic element for another user. For example, controller 110 may consult user data 236 to identify that a first user may be entirely caught up with a television show and may be rewatching the newest episode, while a second user has missed the most recent two episodes of the show. In this example, controller 110 may detect that the second user is about to consume spoilers of the entertainment media (e.g., as the second user is just walking into the room in which the first user is consuming the entertainment media). In response to detecting this, controller 110 may identify that preferences and thresholds 238 indicate that the first user does not want a first viewing to be interrupted, but that second viewings may be either paused or modified to avoid spoilers for other viewers. In response to this determination, controller 110 may modify the entertainment media for the full duration that the second user is in the vicinity of the entertainment media being presented by the respective media device 120.

Figure 3:
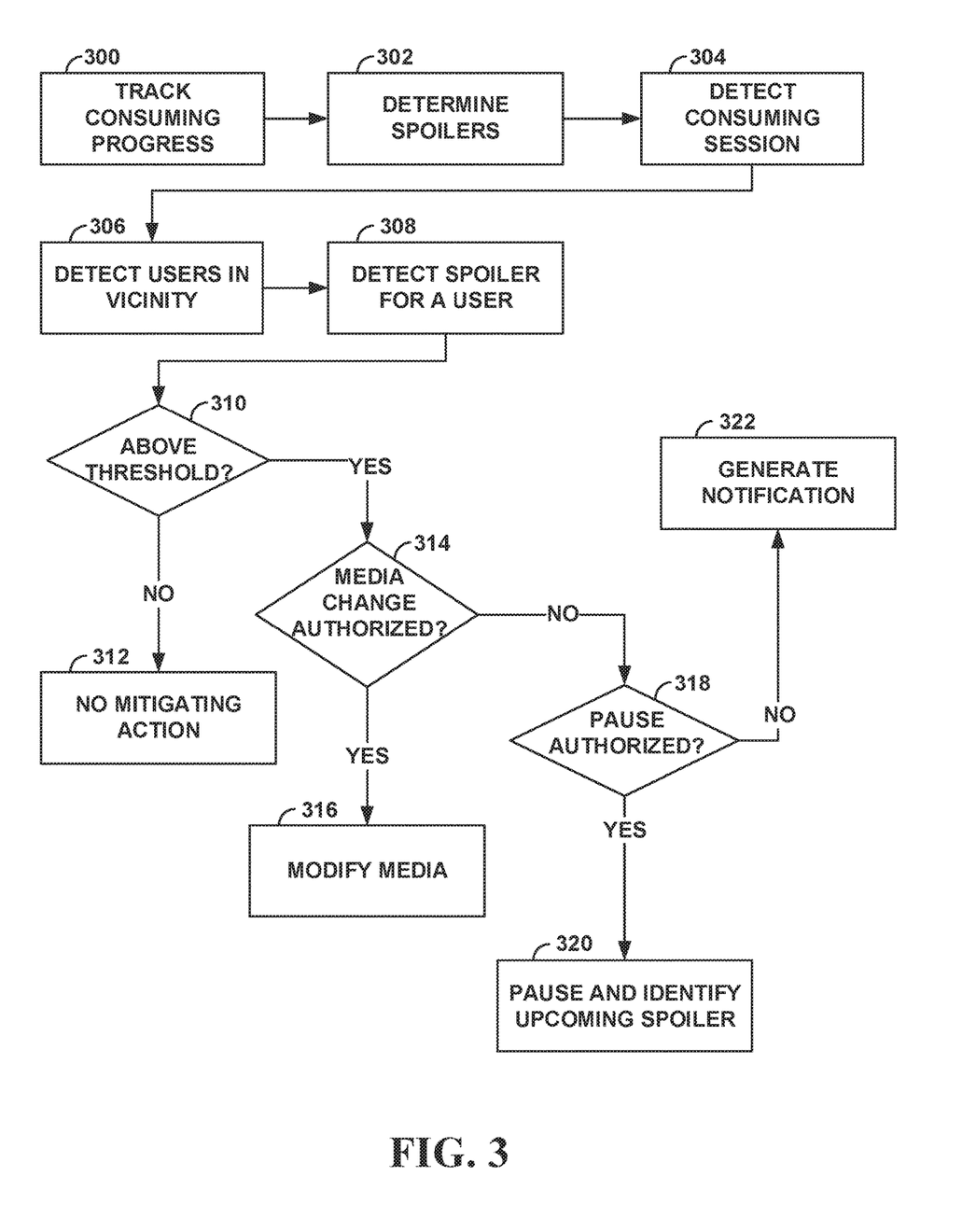
FIG. 3 depicts an example flowchart of evaluating and mitigating media spoilers.

Controller 110 may evaluate and mitigate spoilers of entertainment media according to many techniques. For example, controller 110 may evaluate and mitigate spoilers according to the flowchart depicted in FIG. 3. The flowchart of FIG. 3 is discussed with relation to FIG. 1 for purposes of illustration, though it is to be understood that other systems may be used to execute the flowchart of FIG. 3 in other examples. Further, in some examples system 100 may execute a different method than the flowchart of FIG. 3, or system 100 may execute a similar method with more or less steps in a different order, or the like.

Controller 110 may track a consuming progress of a plurality of viewers for a plurality of entertainment media (300). In some examples, controller 110 may track a progress of entertainment media that users requested that controller 110 track. In other examples, controller 110 tracks a progress of each of the plurality of users consumed by the users, including one or more progress points at which each user has stopped viewing. For example, controller 110 may identify that a first user has not seen the most recent season of a popular TV show. Further, controller 110 may identify that the first user typically watching a local national football league (NFL) team, but has instructed media devices 120 to record the most recent game and has not yet watched it.

Controller 110 may determine spoilers of the entertainment media (302). For example, controller 110 may identify metadata of the entertainment media as indicating spoilers. For other examples, controller 110 may crawl through online repositories 160 to identify spoilers. In some examples, controller 110 may identify not only spoilers within the entertainment media, but also within other sources (e.g., such as news articles, interviews, trailers for the media, or the like).

Controller 110 may detect a consuming session (304). The consuming session may include one or more users consuming portions of media using media device 120A. For example, controller 110 may detect a second user watching the popular TV show or a live NFL game as described above. In response to detecting the consuming session, controller 110 may detect users in the vicinity (306). Controller 110 may detect that the first user is in the vicinity of the second user. Controller 110 may detect users in the vicinity by detecting user devices 130 of the user in the vicinity (e.g., by detecting the user devices 130 connecting to a WLAN network 170 of media device 120A, and/or by detecting NFC communication between user device 120A of the first user and user device 120B of the second user, or the like). Additionally, or alternatively, controller 110 may detect that the first user is in the vicinity by gathering data from sensors 140 that indicate a presence of the first user (e.g., gathering image data of a face of the first user or audio data of a voice of the first user or the like).

Controller 110 may detect an upcoming spoiler (308). For example, controller 110 may detect that the popular TV show entertainment media consumed by the second user is about to expound on a twist of the TV show from one of the first episodes of the most recent season. For another example, controller 110 may detect that the NFL game is about to show statistics from the local NFL game on a "ticker" on the bottom of the screen. For another example, controller 110 may detect that a preview for the next episode of the popular TV show is about to play on media device 120A that many commenters online have noted contains spoilers.

Controller 110 may determine if the upcoming spoiler is above a threshold for the first user (310). For example, the first user may not care about some kinds of spoilers (e.g., such as statistics for the NFL game), such that controller 110 determines that this is not above a threshold that constitutes spoiler for which a mitigating action is to be executed. If controller 110 determines that the spoiler is not above the threshold in this manner, controller may avoid executing a mitigating action (312).

Conversely, if controller 110 determines that the upcoming spoiler is above a threshold severity, controller 110 may determine if a media modification is authorized (314). Controller 110 may identify user preferences for both the first and the second user to determine if a media modification is authorized. For example, controller 110 may identify that modifying the entertainment media is authorized only if both the first user and the second user authorize modifying the entertainment media.

If controller 110 determines that changing the entertainment media is authorized, controller 110 may therein modify the entertainment media (316). For example, using the NFL example above, controller 110 may identify that both users permit modifying the entertainment media to avoid a spoiler for any user that is present, in response to which controller 110 may generate a black graphical box that is located substantially only over the sports ticker (e.g., such that the rest of the "game action" on the screen is still visible) for so long as data about statistics about the local NFL game are being generated. For another example using the popular TV show as discussed above, controller 110 may identify that the first user has authorized media modifications and the second user has authorized media modifications on a second viewing. In response to identifying this, controller 110 may verify that the second user has already seen this episode of the popular TV show, such that this is a rewatching. In response to this, controller 110 may modify the scene of the entertainment media to avoid the spoiler.

In other examples, controller 110 may determine that modifying the media is not authorized (e.g., as specified by preferences of the second user). In such examples, controller 110 may determine whether or not pausing the entertainment media is authorized (318). For example, controller 110 may reference saved user preferences as described herein. Where pausing is authorized, controller 110 may pause the media (320). In some examples, controller 110 may both pause the media and send notifications to one or both users. The notifications may include details as to why the media was paused and/or details of the upcoming spoiler. In some examples, the notification may further provide details as to originating portions of the media that the user may consume, such that the spoilers would no longer be spoilers. In other examples, controller 110 may determine that pausing the media is not authorized. In such examples, controller 110 may only send the notification (322). As described above, the notification may provide details on the spoiler, including an anticipating time before the spoiler is to occur (e.g., "a scene with a spoiler for the popular TV show that you are watching will be shown on media device 120A in three minutes"). In some examples, a user may modify a user preference as to when a spoiler notification is provided. For example, controller 110 may detect that a user has specified that in response to controller 110 detecting an upcoming spoiler of a low severity, controller is to send a notification twenty seconds prior, while for a high severity spoiler controller 110 is to send a notification five minutes prior.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   tracking, by a processor, a progress of a first user in consuming entertainment media;
   identifying, by the processor, a progress point at which the first user stops consuming the entertainment media;
   detecting, by the processor, a second user consuming the entertainment media at a point that is beyond the progress point and within a vicinity of the first user;
   detecting, by the processor evaluating metadata of the entertainment media, a first upcoming spoiler for the first user of the entertainment media;
   determining, by the processor, to execute a first type of mitigating action for the first upcoming spoiler in response to determining that a first severity of the first upcoming spoiler is below a threshold of the first user;
   detecting, by the processor evaluating metadata of the entertainment media, a second upcoming spoiler for the first user; and
   executing, by the processor and in response to detecting the second upcoming spoiler and determining that a second severity of the second upcoming spoiler satisfies the threshold of the first user, a second type of mitigating action that is different than the first type of mitigating action.

2. The method of claim 1, wherein at least one of the first type or second type of mitigating action includes the processor sending an alert to a mobile device of the first user.

3. The method of claim 1, wherein at least one of the first type or second type of mitigating action includes the processor pausing the entertainment media.

4. The method of claim 1, wherein at least one of the first type or second type of mitigating action includes modifying the entertainment media to avoid the second upcoming spoiler.

5. The method of claim 1, further comprising:
   tracking, by the processor, a progress of the second user in consuming the entertainment media;
   determining, by the processor, that the second user is rewatching the second upcoming spoiler of the entertainment media; and
   determining that the second type of mitigation action includes modifying the entertainment media to avoid the second upcoming spoiler in response to determining that the second user is rewatching the entertainment media.

6. The method of claim 1, further comprising:
   tracking, by the processor, a progress of the second user in consuming the entertainment media determining, by the processor, that the second user is watching the second upcoming spoiler of the entertainment media for a first time; and determining that the second type of mitigation action includes sending a notification to the first user of the upcoming spoiler in response to determining that the second user is watching the second upcoming spoiler for the first time.

7. The method of claim 1, wherein detecting the second upcoming spoiler includes crawling across publicly available data repositories to identify the second upcoming spoiler.

8. The method of claim 1, wherein the first user consumes the entertainment media on a first media device, and the second user consumes the entertainment media on a second media device.

9. The method of claim 1, further comprising identifying one or more originating portions of the entertainment media that are spoiled by at least one of the first or second upcoming spoiler, wherein the respective first or second type of mitigating action includes providing the one or more originating portions to the first user.

10. The method of claim 9, wherein providing the one or more originating portions to the first user further comprises generating a link that the first user may use to cause a media device to provide the one or more originating portions of the entertainment media.

11. A system comprising:
a processor; and
a memory in communication with the processor, the memory containing instructions that, when executed by the processor, cause the processor to:
track a progress of a first user in consuming entertainment media;
identify a progress point at which the first user stops consuming the entertainment media;
detect a second user consuming the entertainment media at a point that is beyond the progress point and within a vicinity of the first user;
detect, by evaluating metadata of the entertainment media, a first upcoming spoiler for the first user of the entertainment media;
determine to execute a first type of mitigating action for the first upcoming spoiler in response to determining that a first severity of the first upcoming spoiler is below a threshold of the first user;
detect, by evaluating metadata of the entertainment media, a second upcoming spoiler for the first user; and
execute, in response to detecting the second upcoming spoiler and determining that a second severity of the second upcoming spoiler satisfies the threshold of the first user, a second type of mitigating action that is different than the first type of mitigating action.

12. The system of claim 11, wherein at least one of the first type or second type of mitigating action includes sending an alert to a mobile device of the first user.

13. The system of claim 11, the memory further containing instructions that, when executed by the processor, cause the processor to:
track a progress of the second user in consuming the entertainment media
determine that the second user is rewatching the second upcoming spoiler of the entertainment media; and
determine that the second type of mitigation action includes modifying the entertainment media to avoid the second upcoming spoiler in response to determining that the second user is rewatching the second upcoming spoiler of the entertainment media.

14. The system of claim 11, the memory further containing instructions that, when executed by the processor, cause the processor to:
track a progress of the second user in consuming the entertainment media
determine that the second user is watching the second upcoming spoiler of the entertainment media for a first time; and
determine that the second type of mitigation action includes sending a notification to the first user of the second upcoming spoiler in response to determining that the second user is watching the second upcoming spoiler for the first time.

15. The system of claim 11, wherein the first user consumes the entertainment media on a first media device, and the second user consumes the entertainment media on a second media device.

16. The system of claim 11, the memory further containing instructions that, when executed by the processor, cause the processor to identify one or more originating portions of the entertainment media that are spoiled by at least one of the first or second upcoming spoiler, wherein the respective first or second type of mitigating action includes providing the one or more originating portions to the first user.

17. A computer program product, the computer program product comprising a computer readable storage medium having program instructions embodied therewith, the program instructions executable by a computer to cause the computer to:
track a progress of a first user in consuming entertainment media;
identify a progress point at which the first user stops consuming the entertainment media;
detect a second user consuming the entertainment media at a point that is beyond the progress point and within a vicinity of the first user;
detect, by evaluating metadata of the entertainment media, a first upcoming spoiler for the first user of the entertainment media;
determine to execute a first type of mitigating action for the first upcoming spoiler in response to determining that a first severity of the first upcoming spoiler is below a threshold of the first user;
detect, by evaluating metadata of the entertainment media, a second upcoming spoiler for the first user; and
execute, in response to detecting the second upcoming spoiler and determining that a second severity of the second upcoming spoiler is above the threshold of the first user, a second type of mitigating action that is different than the first type of mitigating action.

18. The computer program product of claim 17, the computer readable storage medium containing further containing program instructions that, when executed by the computer, cause the computer to:
execute the first mitigating action by sending a first alert to a mobile device of the first user in response to the first severity being below the threshold; and
identify one or more intermediate portions of the entertainment media that are spoiled by the second upcoming spoiler, wherein the second mitigating action includes sending a second alert to the mobile device of the first user and providing the one or more intermediate portions to the first user in response to determining that the second severity of the second upcoming spoiler satisfies the threshold of the first user.

* * * * *